United States Patent [19]
Dixon

[11] 3,869,149
[45] Mar. 4, 1975

[54] TRAILER TONGUE SPARE-LANDING WHEEL STRUCTURE

[76] Inventor: Ronald O. Dixon, Rt. 9, Box 430, Albuquerque, N. Mex. 87105

[22] Filed: Sept. 12, 1973

[21] Appl. No.: 396,371

[52] U.S. Cl. .............................. 280/475, 280/150.5
[51] Int. Cl. ............................................. B60s 9/02
[58] Field of Search .......................... 280/475, 150.5

[56] References Cited
UNITED STATES PATENTS

| | | | |
|---|---|---|---|
| 2,159,395 | 5/1939 | Mersereau | 280/150.5 |
| 2,296,789 | 9/1942 | Johnson | 280/150.5 |
| 2,788,227 | 4/1957 | Wallace | 280/475 |
| 2,882,070 | 4/1959 | Bill | 280/475 |
| 3,348,860 | 10/1967 | Buckles | 280/475 |
| 3,360,282 | 12/1967 | Dugan | 280/475 |

*Primary Examiner*—Leo Friaglia
*Attorney, Agent, or Firm*—Clarence A. O'Brien; Harvey B. Jacobson

[57] ABSTRACT

A spare wheel carrier pivotally mounted on a trailer frame forwardly of its rear wheels, is releasably locked in a retracted position or in a plurality of load supporting positions with spare wheel supporting the forward end of the trailer. A fulcrum bracket fixed to the carrier, slidably receives a jack handle lever which is engageable with a reaction lock plate fixed to the trailer frame.

11 Claims, 7 Drawing Figures

TRAILER TONGUE SPARE-LANDING WHEEL STRUCTURE

This invention relates to boat trailers or the like having retractable spare wheel nose supports.

Boat trailers having an elongated frame supported by wheels adjacent a rear end and provided with a tongue hitched to a towing vehicle, are well known. It has also been proposed that such trailers be provided with a spare wheel mounted on a pivotal carrier which is displaceable from a retracted position during travel of the trailer in a hitched condition, to a lowered position in which the spare wheel serves as a supporting nose wheel for the trailer. It is, however, necessary to at least temporarily support the forward end of the trailer frame while the spare wheel carrier is being lowered and locked in a load supporting position. A jack mechanism could, of course, be placed under the trailer frame for this purpose. Aside from the cost of providing a special jack mechanism, the proper placement of the jack and the time and effort incident thereto create problems that render the spare wheel carrier less useful. It is therefore an important object of the present invention to provide a jack mechanism of very simple construction and very easy to use in a unique combination with a retractable spare wheel carrier.

In accordance with the present invention, the spare wheel carrier is releasably locked in a retracted position and in a plurality of load supporting positions defined by locking holes in a lock plate receiving a spring biased locking pin mounted on the spare wheel carrier. The locking plate, which is fixed to the trailer frame, also acts as a reaction member engageable by a jack handle lever pivoted within an opening in a fulcrum bracket fixed to the carrier. After the spare wheel is lowered into contact with the ground, the jack lever may be inserted through the opening in the fulcrum bracket to engage an opening in the locking plate, angularly spaced from the carrier, in order to enable the carrier to be incrementally displaced downwardly to elevate the trailer frame at its forward end by a force exerted on the jack lever.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
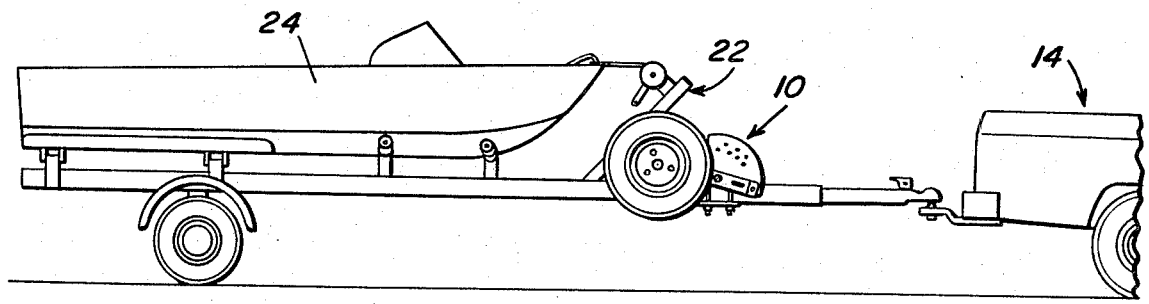
FIG. 1 is a side elevation view showing the spare wheel assembly of the present invention in a retracted position on a boat trailer hitched to a towing vehicle.
Figure 2:
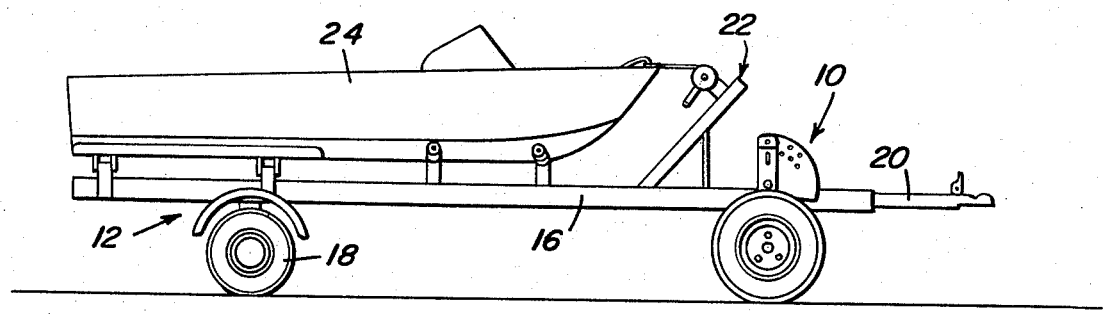
FIG. 2 is a side elevation view showing the spare wheel assembly in a load supporting position.

Referring now to the drawings in detail, FIG. 1 shows the spare wheel assembly of the present invention, generally denoted by reference numeral 10, in a retracted position on a boat trailer 12 hitched to a towing vehicle 14. Except for the assembly 10, the trailer 12 is of conventional design including an elongated frame 16 mounting supporting wheels 18 adjacent its rear end and an extensible tongue 20 at its forward end hitched to the towing vehicle. A winch tower 22 is secured to the frame forwardly of the boat 24 carried on the trailer. The assembly 10 may be mounted on the trailer frame at any desired location intermediate the ends thereof, it being shown forwardly of the winch tower only by way of example. The assembly when lowered as shown in FIG. 2 acts as a nose wheel support for the trailer while unhitched from the towing vehicle.

Figure 4:
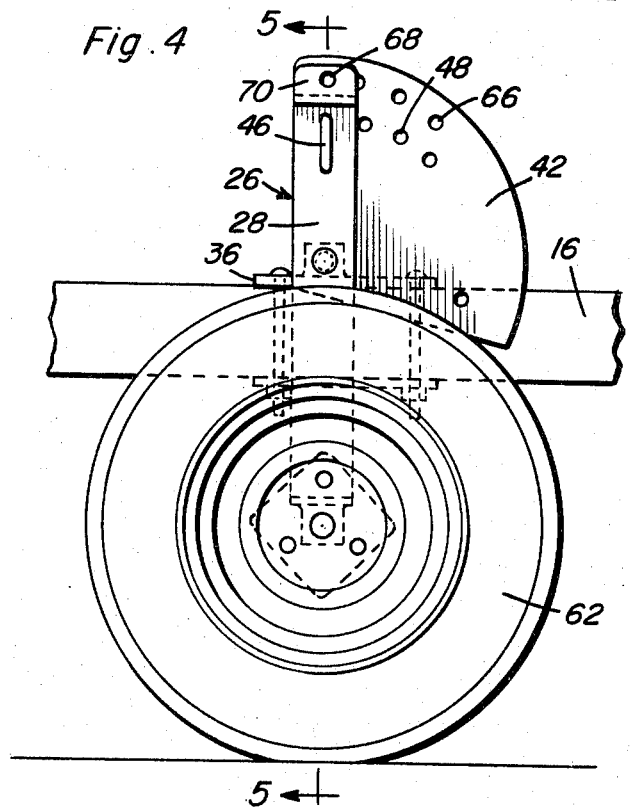
FIG. 4 is an enlarged partial side elevation view of the spare wheel assembly in a load supporting position.
Figure 5:
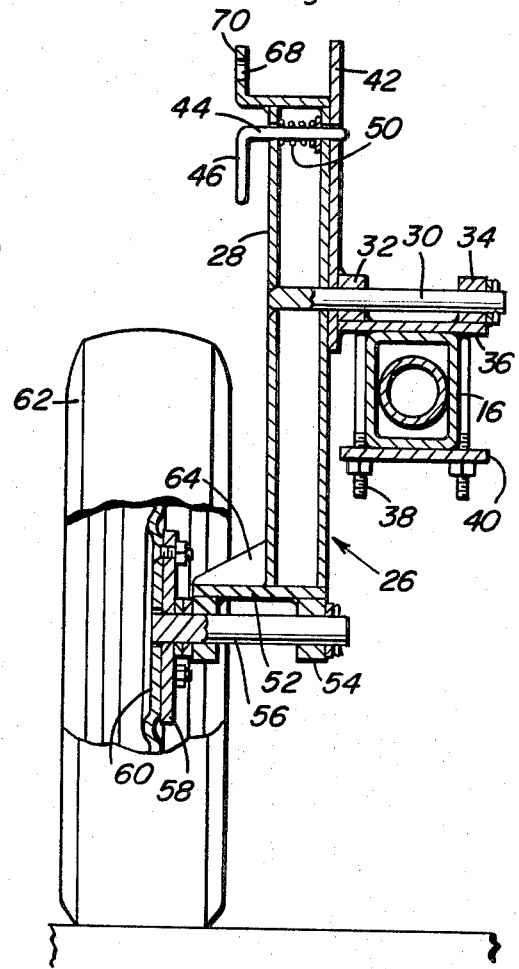
FIG. 5 is a side sectional view taken substantially through a plane indicated by section line 5—5 in FIG. 4.
Figure 6:
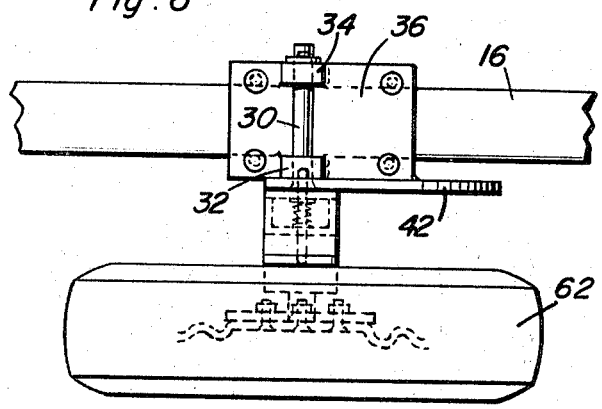
FIG. 6 is a top plan view of the spare wheel assembly as shown in FIG. 4.

Referring now to FIGS. 4, 5 and 6, the assembly 10 includes a carrier generally referred to by reference numeral 26. The carrier is formed by a strut 28 to which a hinge pin 30 is secured by welding and extending laterally from the strut perpendicular to the longitudinal axis of the strut. The hinge pin 30 extends through a pair of laterally spaced bearing blocks 32 and 34 welded to the top of a plate 36 secured to the frame 16 by fastener bolts 38 extending through a lower plate 40 clamped to the underside of the frame. Also secured to the frame by the plate 36 and the bearing block 32 is a locking plate 42 which may be sector shaped.

Figure 7:
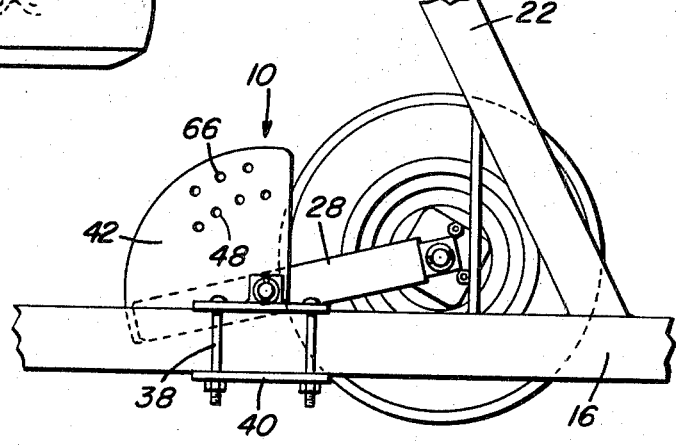
FIG. 7 is an enlarged side elevation view of the spare wheel assembly in the retracted position.

A position locking pin 44 is slidably mounted by the carrier strut 28 adjacent its upper end and is provided with a right angle portion for withdrawing the pin from one of a plurality of locking holes 48 in the locking plate 42. A spring 50 biases the locking pin toward the plate 42 so as to be projected through a hole 48 whenever the carrier is in one of its load supporting positions as shown in FIG. 4 or in its retracted position shown in FIG. 7. The holes 48 are therefore angularly spaced relative to the rotational axis of the carrier extending through hinge pin 30.

An axle supporting plate 52 is welded to the bottom of the carrier strut 28 and extends laterally therefrom on the side opposite the hinge pin 30. A pair of axle bearings 54 depend from the plate 52 to journal an axle 56 to which a hub plate 58 is secured in laterally spaced relation to the carrier strut 28. A wheel 60 is bolted to the hub plate 58 and mounts the spare wheel tire 62. A gusset brace 64 is welded to the strut 28 and plate 52 to form a structurally rigid assembly.

The locking plate 42 is also provided with a second series of holes or openings 66 radially spaced outwardly of the locking holes 48 and angularly spaced between those holes 48 through which the carrier is locked in each of its load supporting positions. The radially outer holes 66 are radially spaced from the rotational axis of hinge pin 30 by a distance substantially equal to the radial distance of an opening 68 formed in a fulcrum bracket 70 welded to the top of the carrier strut 28.

Figure 3:
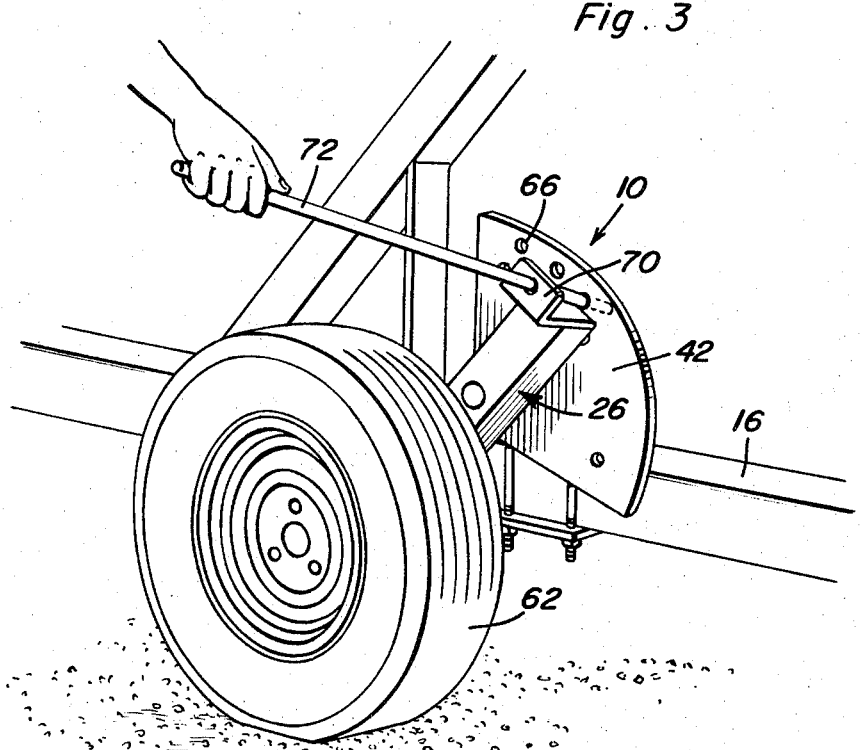
FIG. 3 is a perspective view showing the jacking operation associated with the present invention.

As shown in FIG. 3, a jack handle lever 72 is adapted to be slidably inserted through the opening 68 in the fulcrum bracket which thereby establishes a fulcrum point from the jack lever. The inserted end of lever 72 may then be engaged with the lock plate 42 through one of the holes 66 angularly spaced from the hole 48 through which the carrier 26 is locked to the frame. A force exerted on the end of the jack lever may therefore be transmitted to the carrier 26 through the fulcrum point on the bracket 70 with a mechanical advantage. The locking plate 42 then acts as a reaction member fixed to the frame which is incrementally elevated or lowered, under load by displacement of the jack lever as the opening 68 in the fulcrum bracket is brought into axial alignment with the hole 66 through which the jack lever extends, after the carrier is unlocked from the plate 42 by withdrawal of the locking pin 44. The locking pin will snap into the next locking hole 48 when the carrier reaches the next position. Thus, provision is made for jacking the trailer frame either upwardly or downwardly. Once the trailer frame is hitched to the towing vehicle, the jack lever may be simply withdrawn and the carrier pivotally displaced to its retracted position in which it is locked.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a trailer frame having a tongue adapted to be hitched to a towing vehicle, a jack wheel assembly mounted on the frame, including wheel carrier means pivotally mounted by the frame for displacement between a retracted position elevated above the ground and a plurality of load supporting positions, ground engaging wheel means rotatably mounted by the carrier means for engagement with the ground in the load supporting positions of the carrier means, releasable locking means for holding the carrier means in each of said load supporting positions, and jack means mounted on the carrier means and engageable with the locking means for incremental displacement of the carrier means under load relative to the frame between said load supporting positions.

2. The combination of claim 1 including releasable lock means for holding the carrier means in each of said load supporting positions.

3. The combination of claim 2 wherein said lock means includes a locking element movably mounted by the carrier means and engageable with said reaction member in each of the positions of the carrier means, and means biasing said locking element toward the reaction member.

4. The combination of claim 1 wherein said jack means comprises a lever element and fulcrum means fixed to the carrier means for pivotal support of the lever element about a fulcrum point spaced from said locking means, said lever element being engageable with the locking member at locations angularly spaced from the fulcrum point.

5. The combination of claim 4 wherein said locking means includes a reaction member fixed to the frame and provided with a plurality of openings at said locations through which the lever element extends.

6. The combination of claim 3 wherein said fulcrum means comprises a bracket fixed to the carrier means having a pivot opening slidably receiving the lever element to establish said fulcrum point.

7. In combination with a trailer frame supported by a wheel assembly adjacent a rear end and having a tongue adjacent the other end adapted to be hitched to a towing vehicle, a jack wheel assembly mounted on the frame intermediate said ends thereof, including wheel carrier means pivotally mounted by the frame for displacement between a retracted position and a plurality of load supporting positions, ground engaging wheel means rotatably mounted by the carrier means for engagement with the ground in the load supporting positions of the carrier means, and jack means mounted on the carrier means and engageable with the frame for incremental displacement of the carrier means under load relative to the frame between said load supporting positions, said jack means including a reaction member fixed to the frame having a plurality of holes angularly spaced relative to an axis about which the carrier means is rotatable, a lever element, and fulcrum means fixed to the carrier means for pivotal support of the lever element about a fulcrum point axially spaced from said holes, said lever element being engageable with said reaction member through said holes.

8. The combination of claim 7 wherein said fulcrum means comprises a bracket fixed to the carrier means having a pivot opening slidably receiving the lever element to establish said fulcrum point.

9. The combination of claim 8 including releasable lock means for holding the carrier means in each of said load supporting positions.

10. In combination with a trailer having a frame adapted to be hitched to a towing vehicle, a jack wheel assembly including a wheel carrier pivotally mounted by the frame and displaceable between a retracted position and a plurality of extended positions, ground engaging wheel means rotatably mounted by the carrier for engagement with ground in each of said extended positions, a reaction member fixed to the frame, a fulcrum element fixed to the carrier in spaced relation to the reaction member, and jacking lever means pivotally supported by the fulcrum element and engageable with the reaction member for incrementally displacing the carrier under load between said extended positions.

11. The combination of claim 10 including releasable lock means mounted on the carrier and engageable with the reaction member for holding the carrier in each of the positions thereof.

* * * * *